United States Patent
Hu

(10) Patent No.: US 11,815,487 B2
(45) Date of Patent: Nov. 14, 2023

(54) SOLID STATE REFERENCE GEL

(71) Applicant: Rosemount Inc., Shakopee, MN (US)

(72) Inventor: Jinbo Hu, Minnetonka, MN (US)

(73) Assignee: Rosemount Inc., Shakopee, MN (US)

( * ) Notice: Subject to any disclaimer, the term of this patent is extended or adjusted under 35 U.S.C. 154(b) by 314 days.

(21) Appl. No.: 17/095,418

(22) Filed: Nov. 11, 2020

(65) Prior Publication Data

US 2022/0146453 A1 May 12, 2022

(51) Int. Cl.
*G01N 27/30* (2006.01)
*G01N 27/416* (2006.01)

(52) U.S. Cl.
CPC ....... *G01N 27/4167* (2013.01); *G01N 27/301* (2013.01); *G01N 27/302* (2013.01)

(58) Field of Classification Search
CPC ............. G01N 27/301; G01N 27/4167; G01N 27/3335; G01N 27/302; A61B 5/14539
See application file for complete search history.

(56) References Cited

U.S. PATENT DOCUMENTS

| | | | |
|---|---|---|---|
| 4,797,188 A * | 1/1989 | Tomita | G01N 27/333 |
| | | | 204/414 |
| 7,704,359 B2 | 4/2010 | Sovrano et al. | |
| 9,134,266 B2 | 9/2015 | Thrier | |
| 2005/0133369 A1 | 6/2005 | Sovrano et al. | |
| 2008/0149482 A1 * | 6/2008 | Marett | G01N 27/301 |
| | | | 204/414 |
| 2009/0050477 A1 | 2/2009 | Catt et al. | |
| 2009/0054545 A1 | 2/2009 | Muratoglu et al. | |
| 2010/0155239 A1 | 6/2010 | Sorensen et al. | |
| 2013/0270125 A1 | 10/2013 | Lobbert et al. | |
| 2016/0178556 A1 | 6/2016 | Hanko et al. | |
| 2017/0176371 A1 | 6/2017 | Hanko et al. | |
| 2020/0057043 A1 | 2/2020 | Carlson et al. | |

FOREIGN PATENT DOCUMENTS

| | | | | |
|---|---|---|---|---|
| CN | 109556941 A | 4/2019 | | |
| DE | 102011089707 A1 | 9/2012 | | |
| DE | 102014113260 A1 | 3/2016 | | |
| WO | WO 9304360 A1 * | 3/1993 | ............. | G01N 27/30 |
| WO | 2016/173701 A1 | 11/2016 | | |

OTHER PUBLICATIONS

EPO computer-generated English language translation CN 109556941 A, patent published Apr. 2, 2019 (Year: 2019).*
EPO computer-generated English language translation DE 102014113260 A1, patent published Sep. 13, 2012 (Year: 2012).*

(Continued)

*Primary Examiner* — Alexander S Noguerola
(74) *Attorney, Agent, or Firm* — Westman, Champlin & Koehler, P.A.; Z. Peter Sawicki

(57) ABSTRACT

A solid state gel for use in a pH sensor comprises a reaction product of water, a buffer system for adjusting pH of the gel when in a liquid state, polyethylene glycol or its derivatives as a gelling agent and a salt wherein the water, the buffer, the polyethylene glycol and a reference electrolyte salt when mixed while in a liquid state form a mixture that was subjected to Gamma irradiation to form the reaction product.

32 Claims, 2 Drawing Sheets

(56) References Cited

OTHER PUBLICATIONS

Baird et al., "Effect of Molecular Weight, Temperature, and Additives on the Moisture Sorption Properties of Polyethylene Glycol," Journal of Pharmaceutical Sciences, vol. 99, No. 1, Jan. 2010 (Year: 2010).*
International Search Report and Written Opinion issued for PCT/US2021/058619, dated Feb. 28, 2022.
International Search Report and Written Opinion issued for PCT/US2021/052031, dated Jan. 24, 2022.
Wang, K. et al. "Preliminary assessment of the safety evaluation of the novel pH-sensitive hydrogel." European Journal of Pharmaceutics and Biopharmaceutics 82.2 (2012): 332-339.
"Poly(ethylene glycol)" https://www.sigmaaldrich.com/US/en/product/aldrich/202436 (Year: 2020).

* cited by examiner

SOLID STATE REFERENCE GEL

This disclosure relates to a method of preparing a biocompatible, solid-state reference gel that can be used in pH sensors designed for hygienic applications.

pH sensors that use a liquid reference electrolyte in the reference electrode can suffer from an undesired response fluctuation when exposed to positive process pressure. This behavior is illustrated in FIG. 1, where 2 pH sensors with reference electrodes filled with liquid reference solutions were exposed to various process pressures ranging from 0-90 psi. As process pressure was ramped up from 0 to 30 psi, the two pH sensors started to exhibit response fluctuations. Significant response fluctuations up to 1 pH unit were observed when the process pressure reached 90 psi. Such fluctuations cause significant measurement errors and are not acceptable.

This undesired pressure sensitivity is caused by disturbed ion diffusion from the reference electrode into the process through the reference junction, thus leading to an unstable reference liquid junction potential and subsequently, erratic sensor response. As a result, pH sensors with such behavior are not suitable for applications with positive and varying process pressures.

A common approach to address this problem is to apply an internal pressure to the sensor reference electrode, thus cancelling out the effect of external process pressure by pushing out reference electrolyte through the junction. Several U.S. patents describe the design and manufacturing process of introducing the internal pressure into the reference electrode including U.S. Pat. No. 7,704,359, US 2017/0176371, and U.S. Pat. No. 9,134,266 B2. A pressurized reference chamber is an effective approach to address this issue, but requires significantly complicated mechanical design, validation, and the subsequent development of a manufacturing process.

SUMMARY

This disclosure relates to a solid state gel for use in a pH sensor. The solid state gel comprises a reaction product of water, a buffer system for adjusting pH of the gel when in a liquid state, polyethylene glycol or its derivatives as a gelling agent and a salt wherein the water, the buffer, the polyethylene glycol and a reference electrolyte salt when mixed while in a liquid state form a mixture that when subjected to Gamma irradiation forms the reaction product.

This disclosure further relates to the reaction product wherein the polyethylene glycol or its derivatives comprise approximately 2 to 90 wt % of when in the liquid state.

This disclosure further relates to the reaction product wherein the buffer system comprises a phosphate-based buffer or a carbonate-based buffer.

This disclosure further relates to the reaction product wherein the reference electrolyte salt comprises potassium chloride with a concentration from 0.01 M to saturation or lithium acetate with a concentration from 0.01 M to saturation.

This disclosure further relates to the reaction product wherein the polyethylene glycol has a minimum average molecular weight of approximately 15,000.

This disclosure further relates to the reaction product wherein a viscosity of the gel is adjusted by the concentration and molecular weight of polyethylene glycol or its derivatives The disclosure further relates to the reaction product wherein the Gamma irradiation dose to transform the gel from a liquid state to a solid state is at least 1 kGy.

The disclosure also relates to a method of making a solid state gel for use in a pH sensor. The method comprises mixing water, a buffer system, polyethylene glycol or its derivatives and a reference electrolyte salt to form a mixture and exposing the mixture to Gamma irradiation to form a solid gel.

This disclosure further relates to this method wherein the polyethylene glycol or its derivatives comprise approximately 2 to 90 wt %.

This disclosure further relates to this method wherein the buffer system comprises a phosphate-based buffer or a carbonate-based buffer.

This disclosure further relates to this method wherein the reference electrolyte salt comprises potassium chloride with a concentration from 0.01 M to saturation or lithium acetate with a concentration from 0.01 M to saturation.

This disclosure further relates to this method wherein the polyethylene glycol has a minimum average molecular weight of approximately 15,000.

This disclosure further relates to this method wherein a viscosity of the gel is adjusted by the concentration and molecular weight of polyethylene glycol or its derivatives.

This disclosure further relates to this method wherein the Gamma irradiation dose to transform the gel from a liquid state to a solid state is at least 1 kGy.

The disclosure also relates to a pH sensor comprising a housing and a solid state gel within the housing. The solid state gel comprising a reaction product of water, a buffer system that adjusted pH of the gel when in a liquid state, polyethylene glycol or its derivatives and a reference electrolyte salt which formed a mixture and the mixture was subjected to Gamma irradiation to form the solid gel.

This disclosure further relates to the reaction product wherein the polyethylene glycol or its derivatives comprise approximately 2 to 90 wt % when in the liquid state.

This disclosure further relates to the reaction product wherein the buffering system comprises a phosphate-based buffer or a carbonate-based buffer.

This disclosure further relates to the reaction product wherein the reference electrolyte salt comprises potassium chloride with a concentration from 0.01 M to saturation or lithium acetate with a concentration from 0.01 M to saturation.

This disclosure further relates to the reaction product wherein the polyethylene glycol or its derivatives has a minimum average molecular weight of approximately 15,000.

This disclosure further relates to the reaction product wherein a viscosity of the gel is adjusted by the concentration and molecular weight of polyethylene glycol.

The disclosure also relates to a method of making a pH sensor whose reference electrode is filled with a solid state reference gel. The method comprises mixing water, a buffer system, polyethylene glycol or its derivatives and a reference electrolyte salt to form a mixture, positioning the mixture within a sensor housing and exposing the mixture while in the sensor housing to Gamma irradiation to form a solid gel.

This disclosure further relates to this method wherein the polyethylene glycol or its derivatives comprise approximately 2 to 90 wt % when in the liquid state.

This disclosure further relates to this method wherein the buffer system comprises a phosphate-based buffer or a carbonate-based buffer.

This disclosure further relates to this method wherein the reference electrolyte salt comprises potassium chloride with a concentration from 0.01 M to saturation or lithium acetate with a concentration from 0.01 M to saturation.

This disclosure further relates to this method wherein the polyethylene glycol or its derivatives has a minimum average molecular weight of approximately 15,000.

This disclosure further relates to this method wherein a viscosity of the gel is adjusted by the concentration and molecular weight of polyethylene glycol.

This disclosure further relates to this method wherein the Gamma irradiation dose to transform the gel from a liquid state to a solid state is at least 1 kGy.

DETAILED DESCRIPTION

Figure 1:
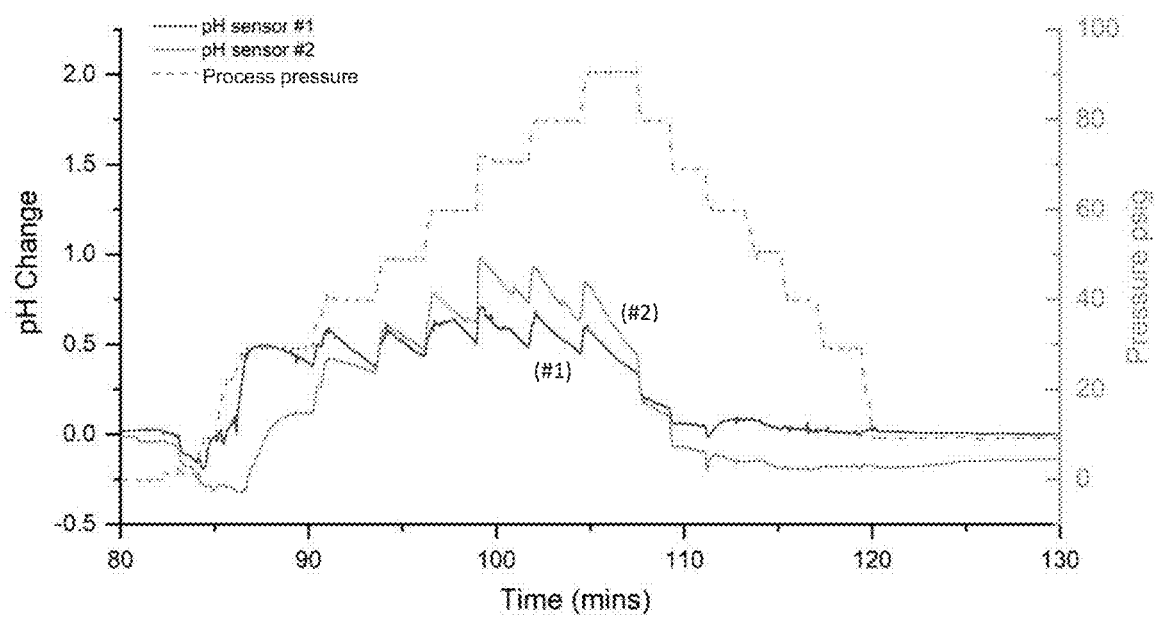
FIG. 1 is a graphical view of pressure sensitivity of prior art sensors.

This disclosure describes a solid-state reference gel that was developed to reduce or eliminate undesired sensor pressure sensitivity at approximately 90 psi. The gel is prepared in a liquid form and remains as a liquid when injected into a sensor reference electrode during a manufacturing process. This allows for easy handling and processing in manufacturing. The liquid gel is subjected to a Gamma irradiation process during which the gel cross-links and transforms into a solidified form. The Gamma irradiation also sterilizes the sensor suitable for use in hygienic environments. Once the gel is solidified, it provides process pressure resistance to the sensor reference electrode.

The gel of this disclosure is the reaction product of four chemical components:
1. Water used as a solvent
2. A buffering system used to adjust the pH of the gel when it is in a liquid form
3. Polyethylene glycol or its derivatives as the gelling agent used to solidify the gel upon Gamma irradiation
4. A reference electrolyte salt to provide a stable reference junction potential, such as potassium chloride or lithium acetate The buffering system may include a phosphate buffer, a carbonate buffer or a citrate buffer.

Polyethylene glycol or its derivatives comprise approximately 2 to 90 wt % of the mixture when in the liquid state which is believed to be sufficient to form the solid gel and preferably approximately 20 wt % of polyethylene glycol or its derivatives is suitable to form the solid gel. Polyethylene glycol derivatives may include but are not limited to methoxypolyethylene glycol, and poly(ethylene glycol) methyl ether methacrylate. Although polyethylene glycol and its derivatives are specifically mentioned as the gelling agent, other polymers may be used as long as the aqueous solution of the polymer solidifies under Gamma irradiation. Other suitable gelling agents may include but are not limited to polypropylene glycol and its derivatives and polyalkylene glycol and its derivatives.

The gel of this disclosure may also be useful in a variety of pH sensors and (Reduction Potential (ORP) sensors whether the gel is irradiated or not.

The potassium chloride is added to form a stable and predictable reference potential when coupled with an Ag/AgCl wire of the sensor. When used in a double-junction reference electrode configuration, other reference electrolytes could be used, such as lithium acetate. The contents of the sensor are then irradiated to form the solid gel.

All four components of the sensor of this disclosure are biocompatible making the sensor useful for hygienic applications, although other applications beside hygienic are contemplated and the disclosure herein should not be so restricted.

The buffering system of the gel contains a suitable pair of acid and its conjugate base such as a phosphate-based buffer, or a carbonate-based buffer. The pH of the gel can be adjusted by controlling the concentration ratio of the acid-base pair within the buffering system. For example, by changing the concentration ratio of $NaH_2PO_4$ to NaOH, the gel pH can be tuned.

The initial viscosity of the gel can be controlled by changing the concentration and the molecular weight of the gelling agent. The higher the concentration and molecular weight, the higher the viscosity.

Example

A gel prototype was prepared by first dissolving approximately 0.106 M of $NaH_2PO_4$, 0.04 M of NaOH, and 1 M of KCl in water to form a phosphate buffer solution. Then, approximately 20 wt % of polyethylene glycol (20,000 average molecular weight) was added in to the buffer solution under magnetic stirring at room temperature. A homogenous liquid gel was formed in approximately 2 hours, with an initial viscosity of approximately 53.7 cP.

The liquid gel was then filled into the reference electrode chamber of a pH sensor. The sensor was then Gamma irradiated at approximately 55 kGy for sterilization and gel solidification. After Gamma irradiation, the liquid gel was solidified with a few small air bubbles generated and locked in place in the solidified gel. This prevents the movement of air bubbles within the sensor, which can lead to undesired sensor spikes.

The sensor of this disclosure filled with this gel was calibrated before and after Gamma irradiation to validate its functionality. As shown in Table 1, the sensor calibrated successfully when the gel was in liquid and solidified form, without significant change introduced by the use of the gel of this disclosure.

TABLE 1

Calibration results of the sensor of this disclosure filled with solid-state reference gel before and after Gamma radiation treatment

| | pH 4 (mV) | pH 10 (mV) | Slope (mV/pH) | Offset (mV) | Glass impedance (Mohms) |
|---|---|---|---|---|---|
| Before Gamma | 155 | −201 | 59.3 | −22.9 | 360 |
| After Gamma | 152 | −199 | 58.5 | −23.5 | 335 |

Figure 2:
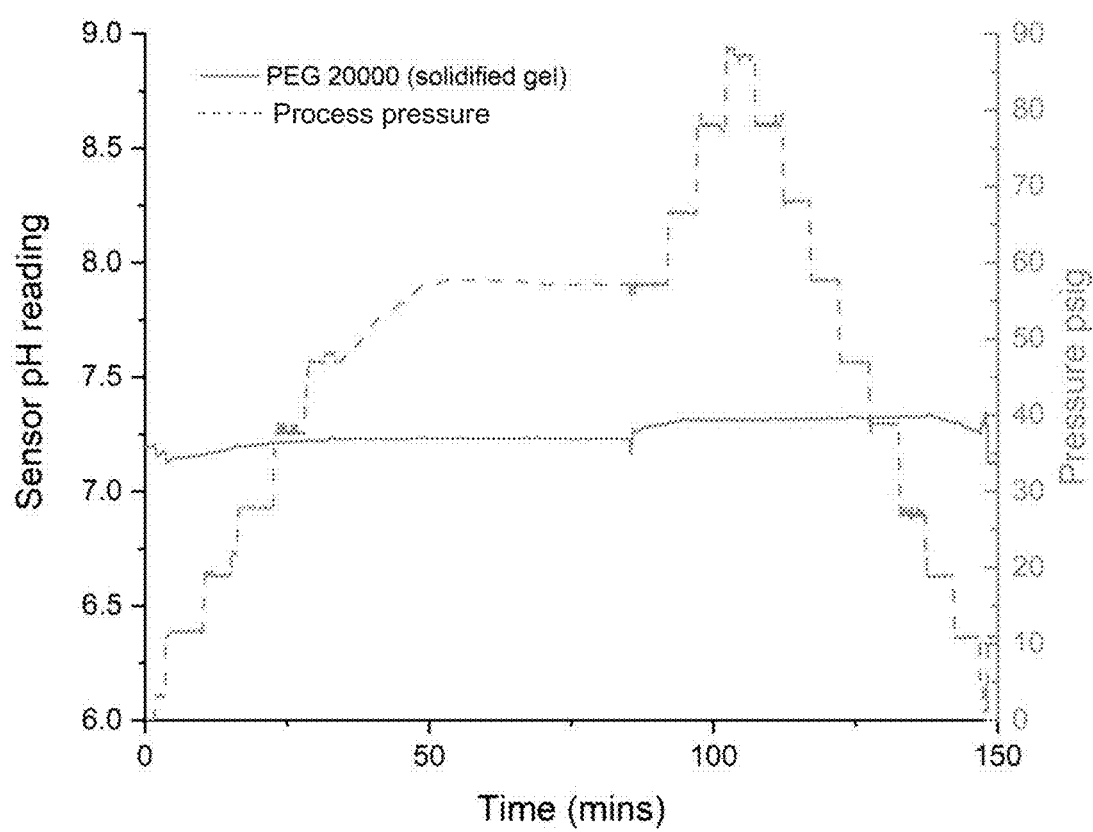
FIG. 2 is a graphical view of pressure sensitivity of the sensor with the solid state gel of this disclosure.

To evaluate the effectiveness of the solid-state reference gel of this disclosure, the sensor filled with this gel (labeled as PEG 20000 solidified gel) was exposed to various process pressures under a constant flow of 15 GPM. No additional internal pressure was applied to the reference chamber of the sensor of this disclosure. As shown in FIG. 2, the PEG 20000 sensor filled with the solid-state gel of this disclosure did not generate pressure response in the range from 0 to 90 psi.

What is claimed is:

1. A solid-state gel for use in a pH sensor, the solid-state gel comprising a reaction product of water, a buffer system for adjusting the pH, polyethylene glycol or its derivatives as a gelling agent, and a reference electrolyte salt wherein the water, the buffer system, the polyethylene glycol or its derivatives and the reference electrolyte salt when mixed while in a liquid state form a mixture that when subjected to Gamma irradiation form the reaction product comprising a polyethylene glycol or its derivatives derived gel.

2. The solid-state gel of claim 1 wherein the polyethylene glycol or its derivatives comprise approximately 2 to 90 wt % of the mixture.

3. The solid-state gel of claim 1 wherein the buffer system comprises a phosphate-based buffer or a carbonate-based buffer.

4. The solid-state gel of claim 1 wherein the reference electrolyte salt comprises potassium chloride with a concentration from 0.01 NI to saturation or lithium acetate with a concentration from 0.01 M to saturation.

5. The solid-state gel of claim 1 wherein the polyethylene glycol has a minimum average molecular weight of 15,000.

6. The solid-state gel of claim 1 wherein a viscosity of the solid-gel is dependent on the concentration of the polyethylene glycol or its derivatives in the mixture and the molecular weight of the polyethylene glycol or its derivatives in the mixture.

7. The solid-state gel of claim 1 wherein the polyethylene glycol derivatives comprise methoxypolyethylene glycol and poly(ethylene glycol) methyl ether methacrylate.

8. The solid-state gel of claim 1 wherein the gel has been exposed to a Gamma irradiation dose of at least 1 kGy.

9. A method of making a solid-state gel for use in a pH sensor wherein the method comprises mixing water, a buffer system, polyethylene glycol or its derivatives and a reference electrolyte salt to form a mixture and exposing the mixture to Gamma irradiation to form a solid gel.

10. The method of claim 9 wherein the polyethylene glycol comprises approximately 2 to 90 wt % of the mixture.

11. The method of claim 9 wherein the buffer system comprises a phosphate-based buffer or a carbonate-based buffer.

12. The method of claim 9 wherein the reference electrolyte salt comprises potassium chloride with a concentration from 0.01 M to saturation or lithium acetate with a concentration from 0.01 M to saturation.

13. The method of claim 9 wherein the polyethylene glycol has a minimum average molecular weight of 15,000.

14. The method of claim 9 wherein a viscosity of the gel is adjusted by increasing the concentration of the polyethylene glycol or its derivatives in the mixture and increasing the molecular weight of polyethylene glycol or its derivatives in the mixture.

15. The method of claim 9 wherein the polyethylene glycol derivatives comprise methoxypolyethylene glycol and poly(ethylene glycol) methyl ether methacrylate.

16. The method of claim 9 wherein the Gamma irradiation dose to transform the mixture from a liquid state to a solid-state is at least 1 kGy.

17. A pH sensor comprising a housing and a solid-state gel within the housing wherein the solid-state gel comprises a reaction product of water, a buffer system, polyethylene glycol or its derivatives and a reference electrolyte salt which formed a mixture when in the liquid state and the mixture was subjected to Gamma irradiation to form the solid-state gel.

18. The pH sensor of claim 17 wherein the polyethylene glycol comprises approximately 2 to 90 wt % of the mixture.

19. The pH sensor of claim 17 wherein the buffer system comprises a phosphate-based buffer or a carbonate-based buffer.

20. The pH sensor of claim 17 wherein the reference electrolyte salt comprises potassium chloride with a concentration from 0.01 M to saturation or lithium acetate with a concentration from 0.01 M to saturation.

21. The pH sensor of claim 17 wherein the polyethylene glycol has a minimum average molecular weight of 15,000.

22. The pH sensor of claim 17 characterized by the sensor not generating a pressure response when subjected to external pressure generated by a process fluid being measured, the external pressure being in the approximate range from 0 to 90 psi.

23. The pH sensor of claim 17 wherein the polyethylene glycol derivatives comprise methoxypolyethylene glycol and poly(ethylene glycol) methyl ether methacrylate.

24. The pH sensor of claim 17 wherein the solid-state-gel had been exposed to a gamma irradiation dose of at least 1 kGy that transformed the mixture from the liquid state to a solid-state.

25. A method of making a pH sensor comprising a reference electrode, the reference electrode being filled with a solid-state reference gel, the method comprising mixing water, a buffer system, polyethylene glycol or its derivatives and a reference electrolyte salt to form a liquid mixture state, positioning the liquid mixture state within a sensor housing and exposing the liquid mixture state while in the sensor housing to Gamma irradiation to form the solid-state reference gel.

26. The method of claim 25 wherein the polyethylene glycol or its derivatives comprises approximately 2 to 90 wt % of the liquid mixture state.

27. The method of claim 25 wherein the buffer system comprises a phosphate-based buffer or a carbonate-based buffer.

28. The method of claim 25 wherein the reference electrolyte salt comprises potassium chloride with a concentration from 0.01 M to saturation or lithium acetate with a concentration from 0.01 M to saturation.

29. The method of claim 25 wherein the polyethylene glycol has a minimum average molecular weight of 15000.

30. The method of claim 25 wherein a viscosity of the gel is adjusted by increasing the concentration of the polyethylene glycol or its derivatives in the mixture and increasing molecular weight of polyethylene glycol or its derivatives in the mixture.

31. The method of claim 25 wherein the polyethylene glycol derivatives comprise methoxypolyethylene glycol and poly(ethylene glycol) methyl ether methacrylate.

32. The method of claim 25 wherein the Gamma irradiation dose to transform the gel from a liquid mixture state to the solid-state reference gel is at least 1 kGy.

* * * * *